G. H. SCHANCK.
SPRING WHEEL.
APPLICATION FILED APR. 4, 1913.
1,084,664.
Patented Jan. 20, 1914.
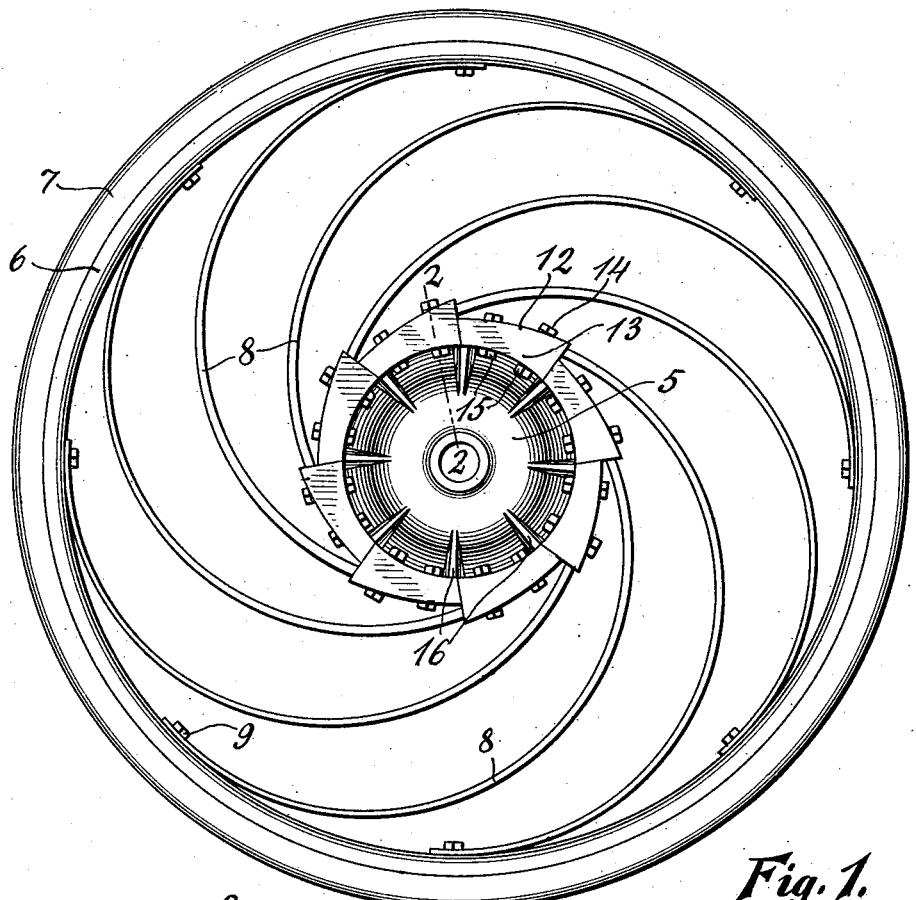
Fig. 1.
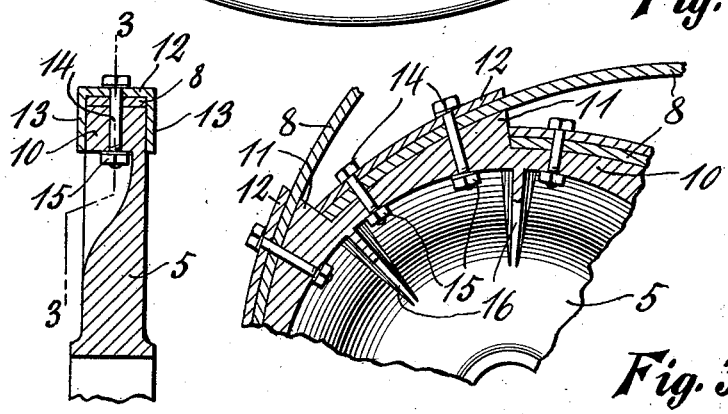
Fig. 2.
Fig. 3.
WITNESSES:
INVENTOR
George H. Schanck.
ATTORNEY

UNITED STATES PATENT OFFICE.

GEORGE H. SCHANCK, OF LIBERTYVILLE, ILLINOIS.

SPRING-WHEEL.

1,084,664.　　　　　Specification of Letters Patent.　　Patented Jan. 20, 1914.

Application filed April 4, 1913. Serial No. 758,838.

*To all whom it may concern:*

Be it known that I, GEORGE H. SCHANCK, a citizen of the United States, residing at Libertyville, in the county of Lake and State of Illinois, have invented certain new and useful Improvements in Spring-Wheels, of which the following is a specification.

This invention relates to that class of spring wheels in which the spokes are resilient, and its object is to provide a novel arrangement of spring or resilient spokes and means for securing the same, as will be hereinafter described and claimed.

In order that the invention may be better understood, reference is had to the accompanying drawing in which—

Figure 1 is an elevation of the wheel. Fig. 2 is a cross section on the line 2—2 of Fig. 1, and Fig. 3 is a section on the line 3—3 of Fig. 2.

Referring specifically to the drawing 5 denotes the hub of the wheel, and 6 indicates the rim, the latter being equipped with a suitable tire 7. Each spoke is a flat strip of suitable metal, semicircular in shape, and tapering in thickness toward the end which is connected to the rim. One end of the spring is rigidly secured to the rim and the other end to the hub, the points of attachment being diametrically opposite each other, but not at the opposing edges of the rim and hub. The spring, from its point of attachment to the hub, extends in a semicircular curve, and is carried to the rim, to which latter it is fastened opposite that edge of the hub which is diametrically opposite the edge to which the inner end is attached. This arrangement permits the use of a relatively long spring, and a maximum resiliency and easy riding is obtained. Bolts 9 are employed for fastening the springs to the rim.

The following fastening for the inner ends of the spokes 8 is provided: The hub has a laterally extending peripheral flange 10, the outer surface of which latter is formed with alternating depressions and raised portions similar to ratchet teeth. The raised portions 11 have their outer surfaces convexly curved to conform to the curvature of the inner ends of the springs, the latter being placed so that their concave sides seat on the curved outer surfaces of the parts 11. Each spring is thus seated, and over its end is placed a cap 12 having side flanges 13 which lap the sides of the parts 11. Through the caps, and the spring beneath the same, are passed bolts 14 which are secured by nuts 15, the latter being screwed on the bolts against the inner periphery of the flange 10.

By the fastening herein described the inner ends of the spokes are securely connected to the hub, and they can be readily connected or removed.

Between the flange 10 and outer face of the hub 5 extend webs 16 for strengthening the parts.

I claim:

A spring wheel comprising a hub having a laterally extending peripheral flange, the outer surface of which flange has alternating raised portions and depressions, a rim, resilient spokes secured at one end to the rim and having their other ends seating on the aforesaid raised portions, caps fitting over the last-mentioned ends of the springs, said caps being co-extensive with the raised portions of the hub flange and abutting against the shoulders formed thereby, said caps also having side flanges lapping the sides of the raised portions, and fastening means passing through the caps, the last-mentioned ends of the springs and the flange.

In testimony whereof I affix my signature in presence of two witnesses.

GEORGE H. SCHANCK.

Witnesses:
　S. J. LEHRER,
　H. G. BATCHELOR.

*Copies of this patent may be obtained for five cents each, by addressing the " Commissioner of Patents, Washington, D. C."*